July 7, 1964 P. J. G. HETZEL 3,140,434
BISTABLE MULTIVIBRATOR CONTROLLED OSCILLATING D.C. MOTOR
Filed Aug. 8, 1960
*Fig. 1*
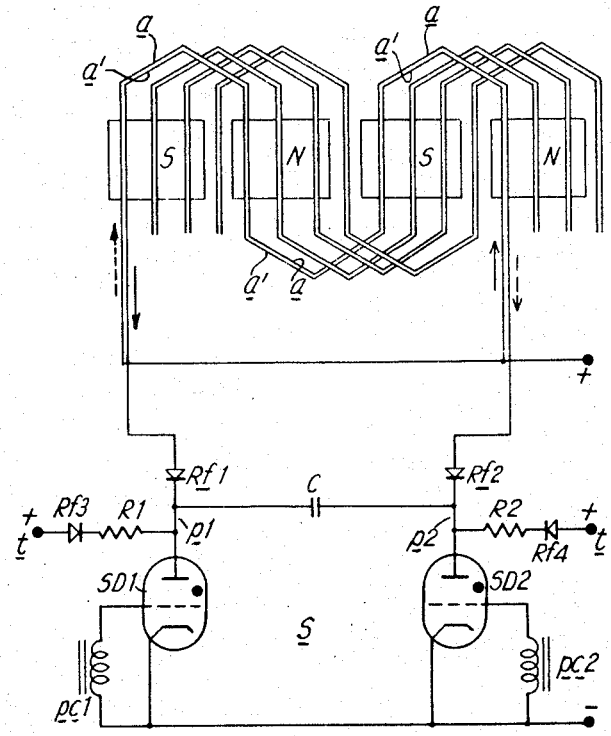
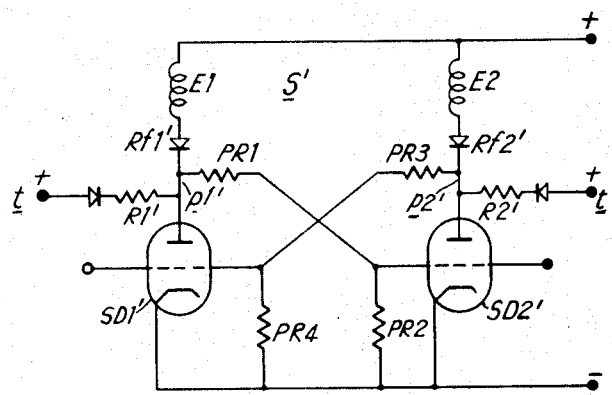
*Fig. 2*
INVENTOR
PETER J.G. HETZEL
ATTORNEY United States Patent Office 3,140,434
Patented July 7, 1964

3,140,434
BISTABLE MULTIVIBRATOR CONTROLLED
OSCILLATING D.-C. MOTOR
Peter John Grenville Hetzel, Dunchurch, Rugby, England, assignor to Associated Electrical Industries Limited, London, England, a British company
Filed Aug. 8, 1960, Ser. No. 48,042
Claims priority, application Great Britain Aug. 11, 1959
3 Claims. (Cl. 318—129)

This invention relates to bistable electric switching circuits capable of being alternated between two conditions in one of which a path for current flow through one of two elements is established and in the other of which a path for current flow through the other of these elements is established. Such a switching circuit could find application, for example, in connection with commutating switching in D.-C. machines, in which event the switched elements could be separate but adjacent armature coils of the machine and the switching circuit would be alternated between its two conditions in rhythm with the passage of these armature coils under alternate field poles: the two coils would be connected in the switching circuit in such manner that current flow through them, as established under the alternate poles, takes place in opposite directions. Other applications of a switching circuit as set forth above can be imagined: for instance, it may be used for coarse/fine switching in connection with speed measurement or control, the voltage supplied to the circuit being derived, say, from a tachometer generator, or it may be used for performing a switching function in connection with warning or correction of low voltage faults in aircraft or other such generating systems.

In a specific, known, form of bistable switching circuit used for switching from one element to another, the elements are connected in series with the main current paths of respective discharge devices, such as thyratrons, which can be rendered conductive by a signal applied to a control grid, and a capacitor C is connected between a point between one discharge device and its load element and a point between the other device and its load element. With one discharge device conductive and a current flow therefore established for the element in series with it, the application of a signal to the other device, which is at this time non-conductive, renders it conductive and the capacitor diverts current from the first device which thereupon extinguishes, that is becomes non-conductive: current flow is therefore in this way transferred from the one element to the other. The operation depends on the capacitor becoming charged with a polarity which holds off the non-conductive discharge device. The charge on the capacitor has to be adequate for this purpose and the capacitance of the capacitor has therefore to be chosen with regard to the voltage which will exist across it at the moment of switching, this voltage being dependent on the voltage drop which then exists across the element for which current flow is already established prior to the switching.

In certain applications such as those mentioned above, the voltage drop across the elements may vary from time to time, for instance due to variation of their effective impedance or of the supply voltage to the circuit, and to enable a switching action to be initiated at a time when this voltage drop is relatively low a capacitor of correspondingly large capacitance would be required. In using the switching circuit for commutating switching in a D.-C. machine, the switching action would preferably be initiated at a time when the E.M.F. in the relevant armature coil approximates to zero, at which time the voltage across the coil will have a very low value, determined almost entirely by the inductive and resistive voltage drops in the coil: consequently a capacitor of inconveniently large size would be required.

To enable a capacitor of small size to be used in such circumstances, it is now proposed, in accordance with the present invention, to include unidirectionally conductive devices (e.g. rectifiers) which are connected between the respective elements and the points between which the capacitor is connected. The polarity in which the rectifiers are connected, being necessarily such as not to block current flow through either load element when the associated switching device is conductive, is also such as to permit the capacitor to be charged when the voltage across the element for which current flow has been established is high, and to retain that charge until required for a subsequent switching action, irrespective of possible reduction of said voltage in the meantime.

Another known form of bistable switching circuit employing switching devices, such as hard valves or transistors, in which a control electrode retains control after the device has been rendered conductive, is somewhat similar to the known form previously described but has the capacitor replaced by two potential dividing cross-coupling connections each taken from a point between one of the elements and the switching device in series with it, to the control electrode of the other switching device. With one of the switching devices conductive, the potential appearing at said point between the other, non-conductive device and its series load element is fed over the relevant potential dividing connection to the control electrode of the conductive device, tending to hold this latter device in conduction until a switching initiating signal renders the other device conductive and the resultant change of voltage at the last-mentioned point referred to renders the previously conductive device non-conductive. In this second form of switching circuit there is no capacitor to be charged. However, to ensure successful switching actions when the supply voltage to the circuit may be relatively low, it may be desirable for the points from which the cross-coupling connections are taken to be connected through respective bleed resistors to a source of auxiliary voltage which ensures that there is at all times sufficient voltage at that one of said points which is for the time being between the non-conducting switching device and its load. There is then the possibility that this voltage at this latter point may be almost short-circuited through the two load elements and the conductive switching device, but this may also be avoided by the application of the invention, namely by including appropriately poled rectifiers between the load elements and the points referred to.

In general terms, therefore, there is provided in accordance with the invention a bi-stable switching circuit comprising a pair of electronc switching devices each providing a main current path and having a control electrode able to control at least the initiation of conduction over said path, respective load elements connected in series with said main current paths of said devices and liable to present a varying voltage drop, each switching device having from a point between it and its series load element to the other switching device a cross-coupling connection effective to render the latter device non-conductive when the former has been initiated into conduction, and unidirectionally conductive devices connected between the respective load elements and said points from which the cross-coupling connections are taken, whereby to tend to eliminate adverse effects of the variable voltage drops of the load elements.

Embodiments of the invention as applied to the two specific forms of bistable circuit referred to above are illustrated by way of example in FIGS. 1 and 2 respectively of the accompanying drawing.

A use of the bistable circuit for commutating switching of a D.-C. machine is illustrated in FIG. 1. The D.-C. machine, shown in a schematic, developed form at 1, has a field system defining alternate north and south poles N and S and a co-operating armature structure having a plurality of armature windings such as $a$ and $a'$ arranged in pairs. The windings of each pair are electrically adjacent to each other (for instance their constituent conductors may be accommodated in the same armature slots), and current flow in each pair of windings such as $a$—$a'$ is controlled by a bistable switching circuit S in such manner that the current flow is switched between the two windings in rhythm with their passage past the field poles, the switching being synchronised to take place when the windings of the pair are between poles. Each switching action stops current flow in the one winding of the pair and starts current flow in the opposite direction in the other winding.

The two armature windings of each pair such as $a$—$a'$ are connected as load elements in series with the main current paths of respective electronic switching devices SD1, SD2 of a kind which can be rendered conductive by a signal applied to a control electrode. Examples of such devices are thyratrons, cold cathode trigger tubes, grid controlled mercury arc rectifiers and semiconductor controlled rectifiers ("trigger diodes"). For the purposes of illustration gaseous discharge tubes have been assumed. Between each armature winding $a$, $a'$ and the device SD1 or SD2 in series with it is connected a rectifier $Rf1$ or $Rf2$ poled to pass current in the same direction as does the switching device. Between the junction points $p1$ and $p2$ between these two rectifiers and the respective switching devices SD1 and SD2 is connected a cross-coupling capacitor C which, in the manner already described, gives the switching circuit its bistable character. Initiating signals generated synchronously with rotation of the machine in any convenient manner, for instance by an auxiliary rotary field (not shown) influencing pickup coils such as $pc1$ and $pc2$, are applied alternately to the control electrodes of the two switching devices SD1 and SD2 with such timing as to initiate a switching action, and thereby transfer current flow from one winding of the pair to the other, with reversal of direction as indicated by the arrows, at such times as the windings are between poles. For starting and slow speed running, in which circumstances the E.M.F. across the coils cannot become great enough to adequately charge the capacitor for the switching action, the necessary charging may be achieved by the inclusion of resistances such as R1 and R2 between the points $p1$ and $p2$ and a source of suitable voltage connected at terminals $t$. These resistances R1 and R2 have a relatively high value so as not to have an appreciable shunting effect on the armature windings: the voltage connected at terminals $t$ may be the positive line voltage of the machine or a tapping thereof. There may then be a possibility that voltages generated in the armature windings would tend to drive current back into the line, but this can be prevented by means of further, appropriately pole rectifiers such as $Rf3$ and $Rf4$ connected in series with the resistances R1 and R2.

With device SD1 conducting and SD2 non-conducting, so that current is flowing in armature winding $a$ but not $a'$, the voltage drop across winding $a$ brings point $p1$ less positive than point $p2$ and capacitor C therefore charges. Should the voltage drop across winding $a$ decrease for any reason while device SD1 is still conductive, there would be a tendency for capacitor C to lose some of its charge, but this is prevented by the presence of rectifier $Rf1$. Rectifier $Rf2$ acts similarly when device SD2 is conductive instead of SD1.

In the embodiment of FIG. 2 the switching devices SD1' and SD2' of the bistable switching circuit S' are assumed for illustration to be high vacuum valves having control electrodes, but could be equally constituted by other devices, for example transistors, having a control electrode which retains control after the device has been rendered conductive. Here the two devices are cross-coupled as previously explained by means of two potential dividing connections PR1, PR2 and PR3, PR4. Load elements E1 and E2, which again may represent armature windings for example, are connected in series with the switching devices SD1' and SD2' with intervening rectifiers $Rf1'$ and $Rf2'$ between the elements E1 and E2 and the points $p1'$ and $p2'$ from which the cross-coupling connections PR1, PR2 and PR3, PR4 are taken. Bleed resistors R1' and R2', ensuring proper switching should the supply voltage be low, are connected to points $p1'$ and $p2'$ and have rectifiers $Rf3'$ and $Rf4'$ connected in series with them for isolation purposes if required. When the switching device SD1' is conductive (SD2' being nonconductive) the presence of rectifier $Rf2'$ prevents the voltage at point $p2'$ from being almost short circuited via elements E2 and E1 and conductive element SD1' at such times as the voltage generated across element E1 may be low. Rectifier $Rf1'$ acts similarly when device SD2' is conductive instead of SD1'.

What I claim is:

1. In combination with a D.-C. machine having alternate north and south field poles and having armature windings which for effecting commutation are required to be switched in pairs so as to carry current alternately in rhythm with their passage past the field poles of the machine, at least one bistable switching circuit comprising a pair of electronic switching devices each providing a main current path and having a control electrode able to control at least the initiation of conduction over said path, respective load elements connected in series with said main current paths of said devices, said load elements being constituted by a pair of said armature windings and being such as to present a varying voltage drop, each switching device having from a point between it and its series armature winding load element to the other switching device a cross-coupling connection effective to render the latter device non-conductive when the former has been initiated into conduction, and unidirectionally conductive devices connected between the respective armature winding load elements and said points from which the cross-coupling connections are taken, whereby to tend to eliminate adverse effects of said variable voltage drops.

2. A circuit as claimed in claim 1 wherein said switching devices have a common cross-coupling connection constituted by a capacitor connected between points between the switching devices and their respective series load elements.

3. A circuit as claimed in claim 1 wherein said switching devices are of a kind having a control electrode which retains control when the device is conductive, and wherein such switching device has a potential dividing cross-coupling connection taken from a point between it and its series load element to the control electrode of the other switching device.

References Cited in the file of this patent
UNITED STATES PATENTS

| | | |
|---|---|---|
| 2,540,025 | Bergfors | Jan. 30, 1951 |
| 2,611,824 | Van Duuren | Sept. 23, 1952 |
| 2,644,916 | Alexeanderson | July 7, 1953 |
| 2,803,747 | Wood | Aug. 20, 1957 |
| 2,944,166 | De Miranda | July 5, 1960 |
| 2,980,839 | Haeussermann | Apr. 18, 1961 |
| 3,025,443 | Wilkinson | Mar. 13, 1962 |